United States Patent [19]
Knowlden et al.

[11] 3,736,061
[45] May 29, 1973

[54] AIRCRAFT PROXIMITY WARNING INDICATOR SYSTEM

[75] Inventors: Gary L. Knowlden, Torrance; David I. Blanchard, Los Angeles, both of Calif.

[73] Assignee: Hughes Aircraft Company, Culver City, Calif.

[22] Filed: Feb. 12, 1970

[21] Appl. No.: 10,816

[52] U.S. Cl. ........... 356/141, 343/113 R, 250/217 R, 356/4, 343/112 CA
[51] Int. Cl. ............................................ G01b 11/26
[58] Field of Search .................. 356/4, 141, 5; 250/64, 203, 217 R; 343/112 CA, 113 R

[56] References Cited

UNITED STATES PATENTS

| 3,203,305 | 8/1965 | Fairbanks | 250/203 |
| 3,321,758 | 5/1967 | Elliott | 343/112 CA |
| 2,994,867 | 8/1961 | Pierce | 343/112 CA |
| 3,345,633 | 10/1967 | Runge | 343/112 CA |
| 3,424,907 | 1/1969 | Fischell | 250/203 |
| 3,572,928 | 3/1971 | Decker, Jr. et al. | 356/4 |
| 3,430,235 | 2/1969 | Bender et al. | 343/5 DP |
| 3,563,651 | 2/1971 | Alvarez et al. | 356/4 |

Primary Examiner—Benjamin A. Borchelt
Assistant Examiner—S. C. Buczinski
Attorney—James K. Haskell and Walter J. Adam

[57] ABSTRACT

An aircraft warning system is disclosed for detecting and displaying the relative azimuth and elevation of any aircraft xenon beacon in the vicinity. A total field of view for the system is provided by two or more sensor units which have overlapping subfields. The subfield of a given unit is formed by the composite view of an array of radiation-sensitive devices, each coupled to a separate lamp in a display instrument by a signal processing channel adapted to identify beacon radiation pulses and reduce false alarms. Each lamp illuminates a separate segment of the display instrument to indicate relative azimuth and elevation of the detected beacon.

8 Claims, 12 Drawing Figures

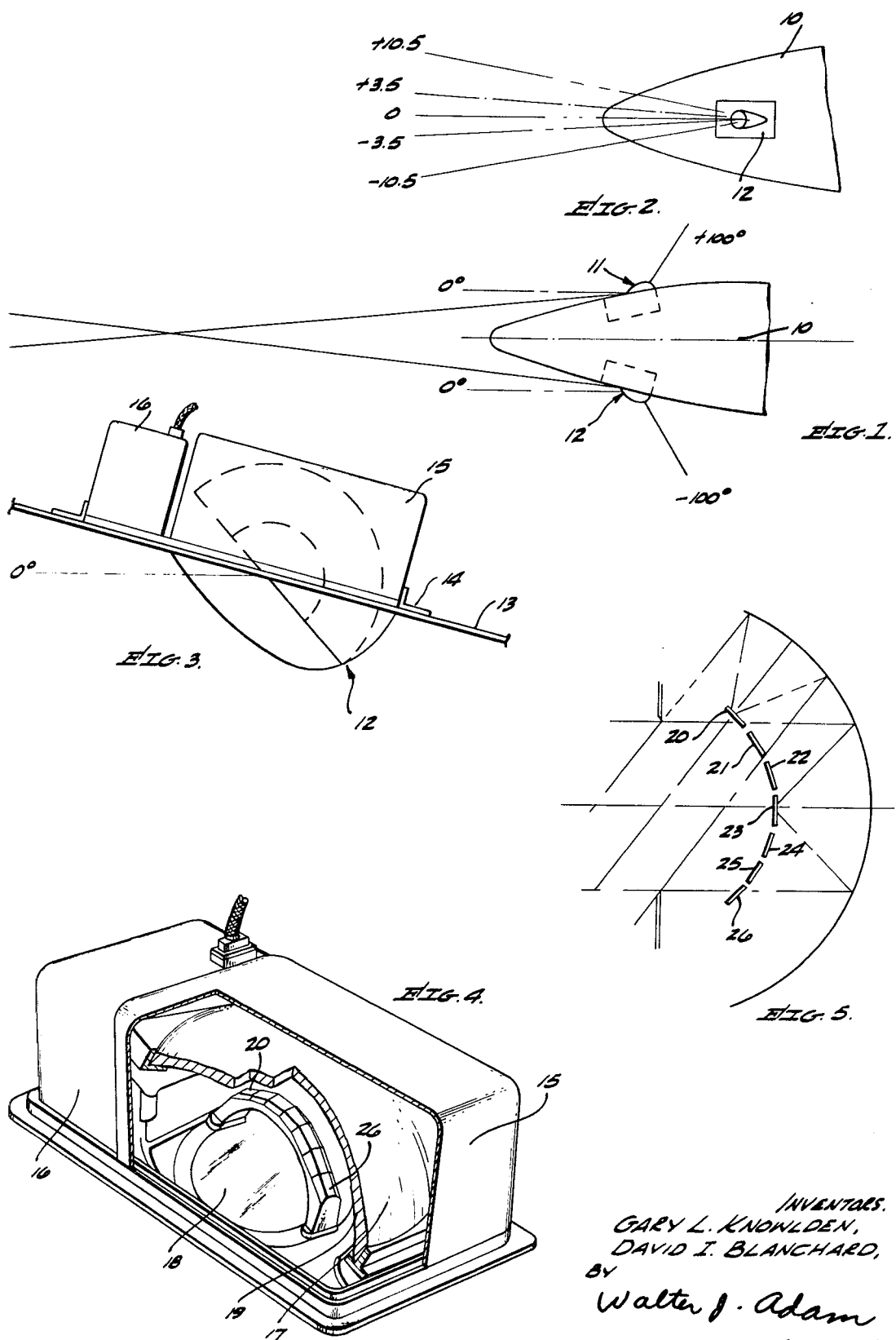

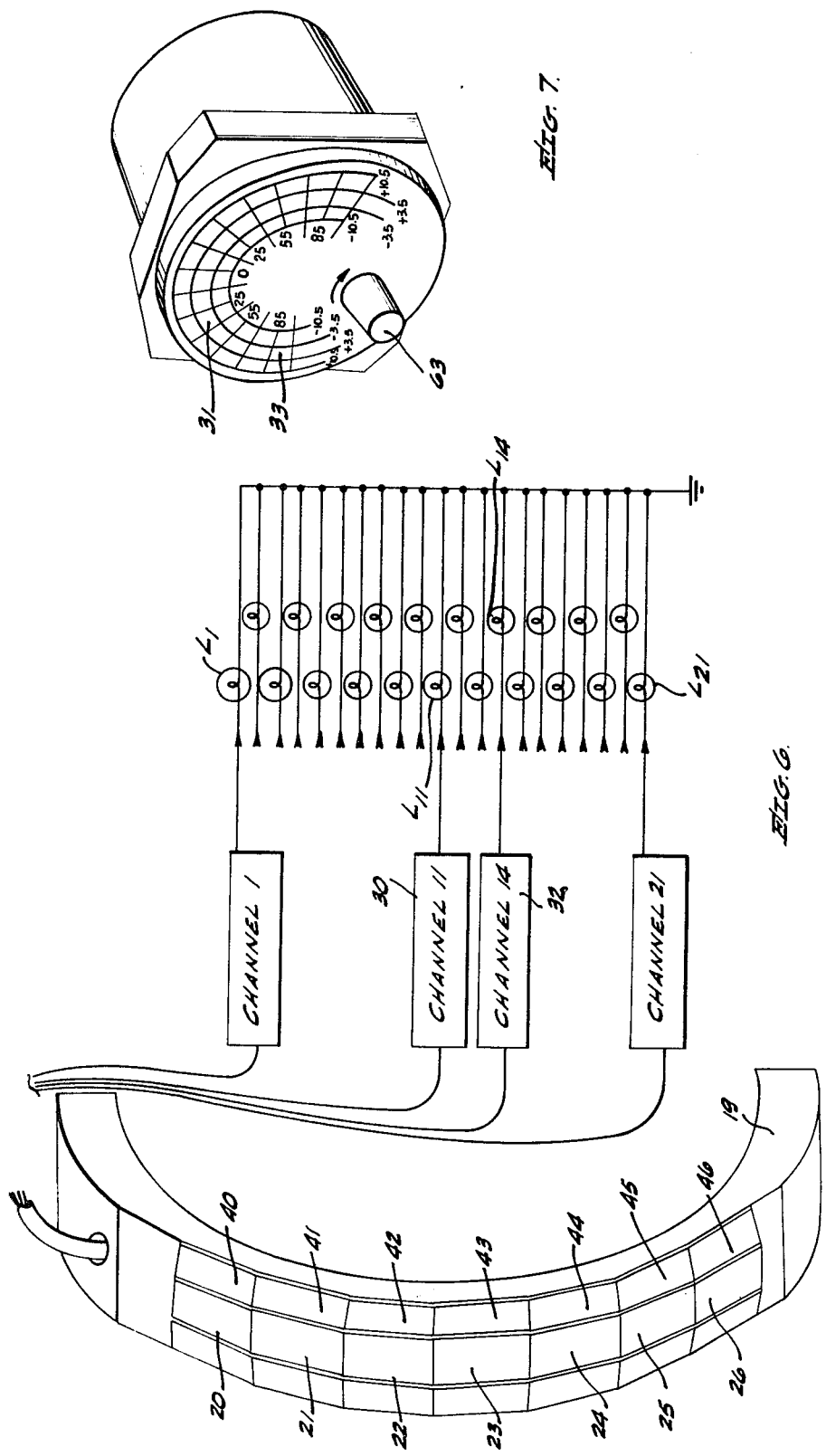

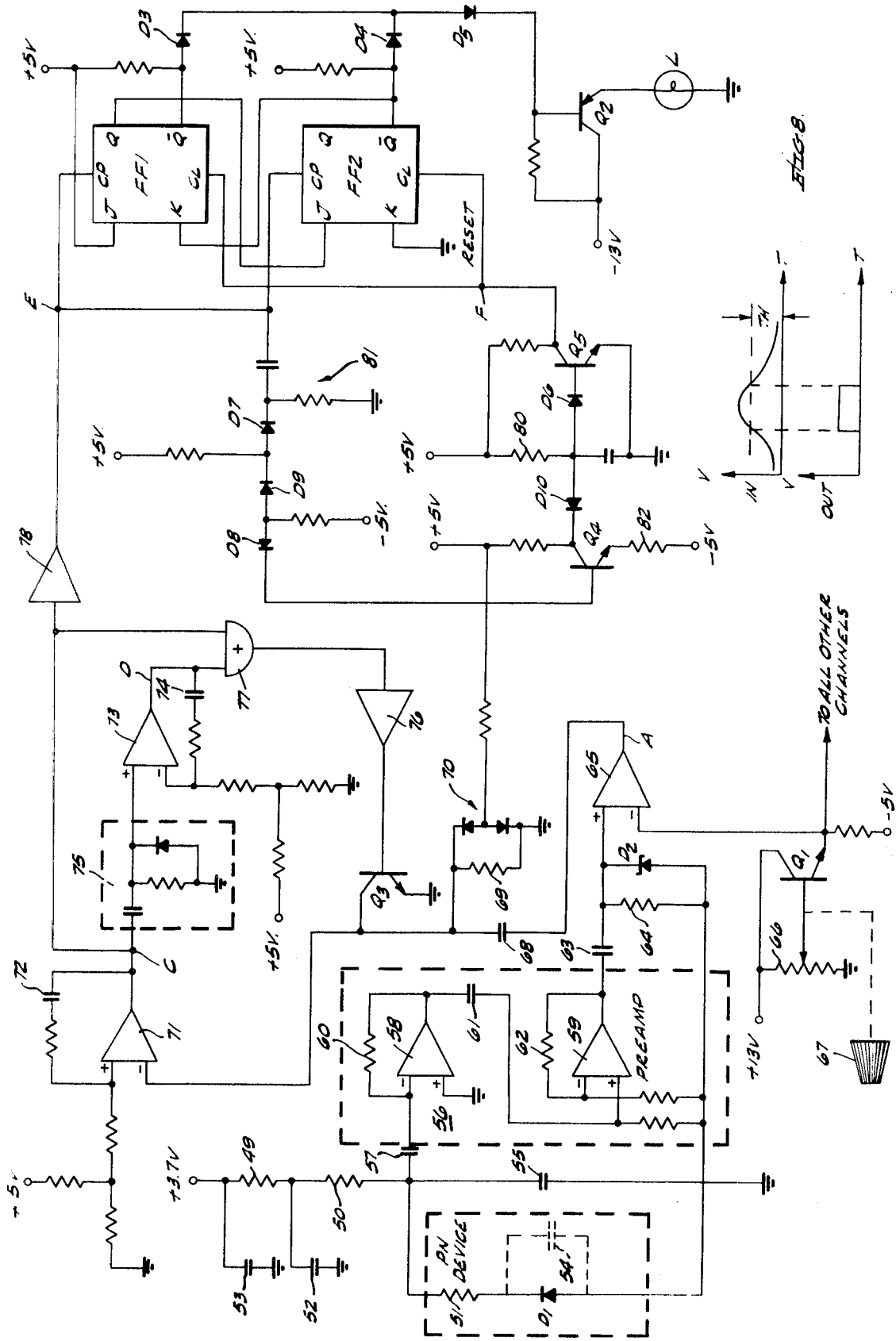

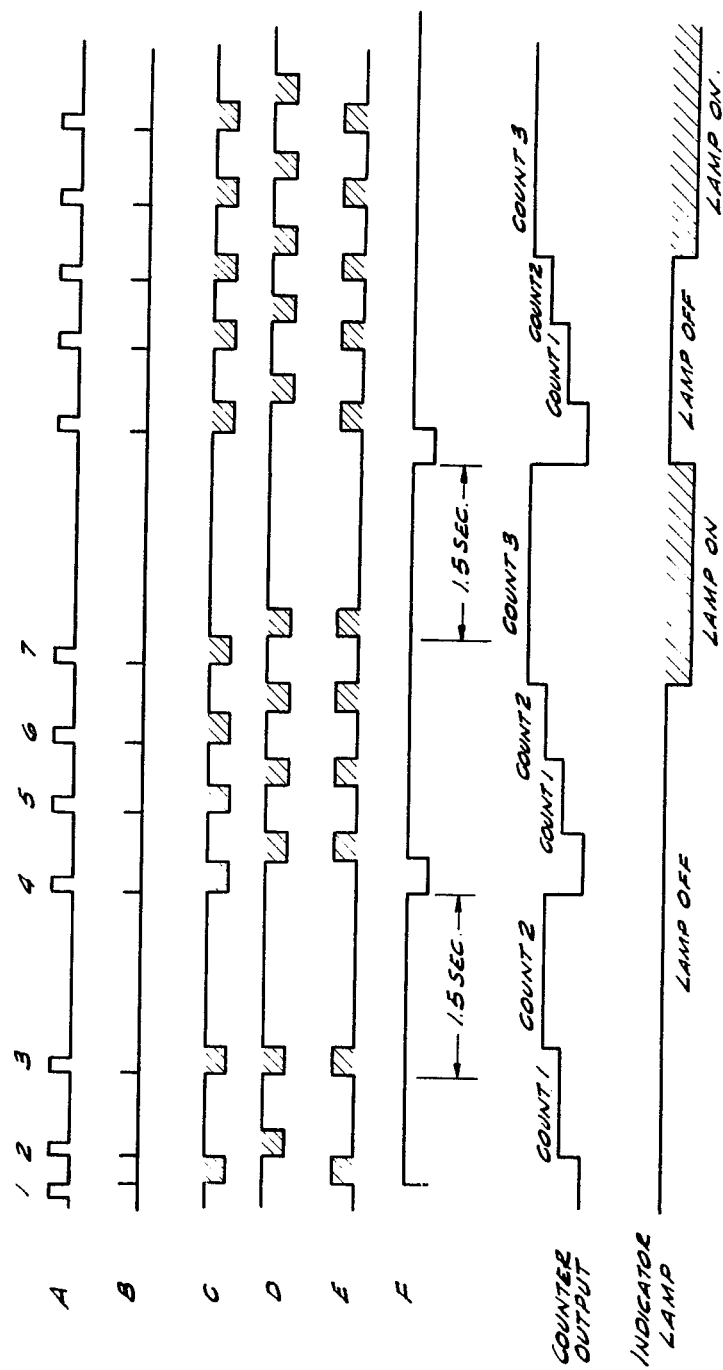

AIRCRAFT PROXIMITY WARNING INDICATOR SYSTEM

BACKGROUND OF THE INVENTION

This invention relates to systems such as may be utilized in detecting the presence of aircraft, and particularly to a system that detects radiation emitted by beacons carried by other aircraft.

There is a great need for a system to alert an aircraft pilot to the presence of other aircraft in the vicinity, and to provide him with their angular positions in order that he may undertake appropriate maneuvers to prevent a collision. There is also a need for an aircraft detection system that operates independently of the normal traffic control radar as an alternative or "back-up" system because, under some conditions, a radar system may fail to detect a small airplane in the landing pattern. Systems that have been previously demonstrated have required that other aircraft carry a radar beacon or transponder in order that their presence be detected. Such systems have not been satisfactory for general use because they generally require precise time-frequency synchronization techniques, besides requiring that other aircraft carry special equipment.

A system acceptable for general use should provide warning of the presence of other aircraft and indicate their approximate position without the need for special equipment, other than visual warning beacons which radiate energy that can also be detected by radiation sensors, and simple signal detecting techniques in the receiver. Such a system should also be relatively inexpensive, easy to maintain and operate, and relatively light in weight if it is to be widely accepted and used by even small aircraft owners who maintain aircraft only for pleasure.

SUMMARY OF THE INVENTION

Briefly, the detection system of the present invention utilizes a plurality of electromagnetic radiation sensitive devices to continually monitor a predetermined field relative to a reference axis of a fixed platform, or axis of an aircraft functioning as a moving platform, such that each monitors a sector of the field and responds to electromagnetic radiation in a predetermined spectral region characteristic of a visual beacon on a threatening aircraft (target) present in its assigned sector.

A signal processing means responds to electromagnetic radiation received by each device and illuminates segments of a display matrix associated with any devices receiving radiation. The display matrix indicates the angular position of a target in azimuth and elevation relative to the fixed platform or aircraft axis by the position of the segment in the matrix effectively illuminated by the target.

The electromagnetic radiation (EM) detected is preferably infrared radiation emitted in pulses having readily identifiable characteristics, such as rise time, pulse width and repetition rate. However, in the broadest aspects of the present invention, any suitable EM radiation detection system may be employed.

It is therefore an object of this invention to provide a simplified system responsive to EM radiation for providing an indication of aircraft in the vicinity of an array of EM sensitive devices, and for displaying the angular position of the detected aircraft relative to the array.

It is a further object of this invention to provide a system for detecting the presence of EM radiation emanating from aircraft and for displaying the angular position of the detected aircraft relative to the system.

It is another object of this invention to provide a system for detecting the presence of pulsed visual warning beacons carried by aircraft in the vicinity of an array of radiation sensitive devices, and for displaying the angular position of the detected aircraft relative to the array.

It is still another object of this invention to provide an airborne system for detecting the presence of pulsed visual warning beacons carried by aircraft and for displaying the angular position of such aircraft relative to the airborne system.

The novel features of the invention itself, both as to its organization and method of operation, will best be understood from the following description with reference to the accompanying drawings in which like reference characters refer to like parts.

BRIEF DESCRIPTION OF THE DRAWINGS

FIG. 1 illustrates a top view of the nose of an aircraft having a sensor assembly mounted on each side, each with a non-obscured field of view of 105° in azimuth and an overlap of 5° in the forward direction.

FIG. 2 illustrates a side view of the aircraft nose illustrated in FIG. 1 indicating a non-obscured field of view of ± 10.5° in elevation for the sensor assemblies of FIG. 1.

FIG. 3 illustrates in a top view a sensor assembly package installed in the skin of the aircraft nose of FIG. 1.

FIG. 4 illustrates an isometric view of a sensor assembly package partially broken away in the rear to show details of an array of light sensitive devices and a hemispherical mirror.

FIG. 5 is an optical schematic diagram of the sensor assembly in the package of FIG. 4.

FIG. 6 illustrates an array of 21 light-sensitive devices bonded to an arcuate support such that the center of each device is tangent to a sphere, and a bank of indicating lamps, each connected to a predetermined one of the devices in the array by a separate signal processing channel.

FIG. 7 illustrates an isometric view of a display unit for use with the embodiment illustrated in FIGS. 1 to 6, each segment being illuminated by a separate lamp energized by a device through its associated channel.

FIG. 8 is a schematic diagram of one of the signal processing channels of FIG. 6.

FIG. 9 is a timing diagram for the operation of the channel illustrated in FIG. 8.

DESCRIPTION OF THE PREFERRED EMBODIMENTS

Figure 10:
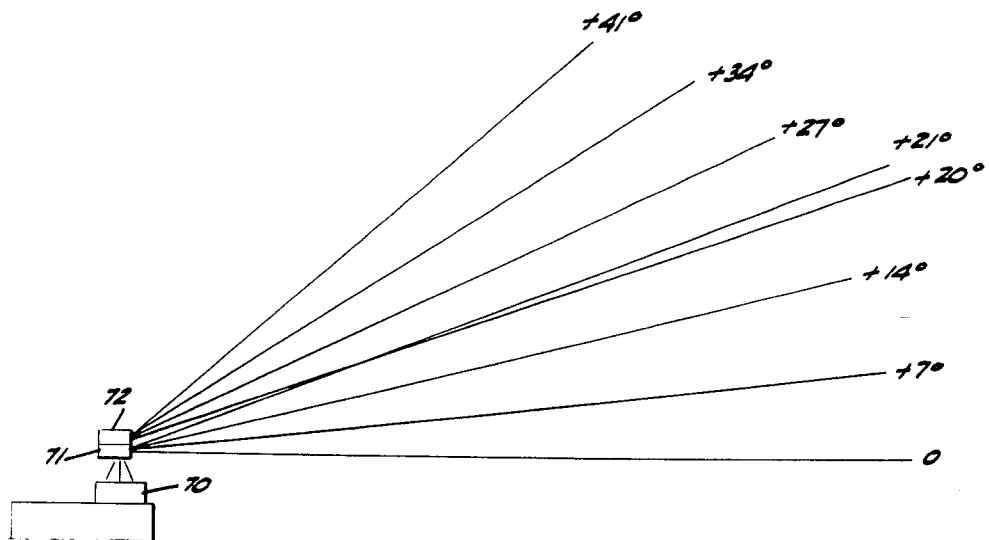
FIG. 10 is a diagramatic side view of a second embodiment of the present invention having a fixed platform for sensor assemblies.

Referring now to FIG. 1, a top view of an aircraft nose 10 is shown as a platform for two sensor assembly units 11 and 12 mounted in such a manner that together they have a non-obscured field of view of ± 100° in azimuth relative to the longitudinal axis of the aircraft. The field of view is made up of two overlapping sub-fields from − 5° to + 100° on the right (starboard) and + 5° to − 100° on the left (port), thereby providing an overlap of 5° in the forward direction. Each sensor unit also provides a view of ± 10.5° in elevation as illustrated in FIG. 2 for the unit 12. In that manner, each sub-field includes a sector 105° in azimuth and 21° in elevation.

FIG. 3 illustrates in a top view, the manner in which the unit 12 is mounted in the skin 13 of an aircraft with a peripheral bracket 14. The unit comprises a sensor housing 15 and an electronic package 16. The sensor unit 11 is identical to the sensor unit 12 but mounted as a "mirror image" on the opposite side of the aircraft nose by rotating it 180° relative to the unit 12. That provides the obvious advantage of lower unit cost in production and minimum spare-part logistics.

The optical system of the sensor assembly unit 12 will now be described with reference to FIGS. 4 and 5. It comprises a section of a spherical mirror 17 having a predetermined focal length, such as 3.0 inches, and an entrance window 18. The radius of the mirror is measured from the center of the window 18 which has a diameter of 4.7 inches. A cast aluminum support 19 is provided for an array of light-sensitive devices shown more clearly in FIG. 6 as comprising 21 silicon PN devices bonded to an outside surface of the support 19, such as PN device 20, each device being 0.784 inch long, 0.366 inch wide and essentially flat or planar. The gross shape of the support to which the PN devices are bonded is spherical with a radius of 3.16 inches to the center of the face of each device, thus providing an image surface of 3.16-inch radius.

The PN devices are arranged in three rows of seven elements each, thereby providing a field of view for each PN device of approximately 15° in azimuth and 7° in elevation. When the sensor assembly unit is mounted as described hereinbefore with reference to FIG. 1, the total field of view of the array is then 105° in azimuth and 21° in elevation.

In the optical schematic of FIG. 5, a single row of devices 20 to 26 are shown with the spherical mirror and aperture stop (illustrated only schematically) receiving radiation from two directions, one normal to the aperture stop and one from an extreme angle. Radiation from the direction normal to the aperture stop is focused on the sensor device 23 at the center of the row while radiation received from the direction at an extreme angle is focused on the sensor device 20.

If a purely concentric design were to be employed in the optical system, the images focused on the devices would be quite clear were it not for a slight blurring caused by the support 19 in the optical path. Since the blurring will vary depending upon the position of the radiation source, it has been found desirable to equalize, as much as possible, the blur size across the entire field of view by departing from the purely concentric design for the optical system and placing the image surface (devices) a distance less than the 3.0 inch focal length of the spherical mirror, such as 2.8 inches.

A single aluminum casting provided to include the support 19, a frame for the entrance window 18 and support for the spherical mirror 17. By this type of construction, all important alignments, such as optical centering and focusing, and the optical tolerances between the center line of the aircraft and the mounting surfaces, can be maintained without extraordinary machining tolerances or adjustments. The spherical mirror 17 and the entrance window 18 are preferably so supported in the single casting the expansion and contraction due to temperature changes will have no detrimental effect, either optically or mechanically. That may be readily accomplished by supporting each with an elastomer that not only securely bonds the elements to the aluminum casting, but also protects the elements against shock and vibration.

The housing 15 and the window 18 will provide an enclosure for the mirror 17 and the array of radiation-sensitive devices that is substantially protected against dust and moisture so that once a unit has been assembled, no periodic maintenance will be required except to clean the outside surface of the window 18. However, the photo-sensitive P surfaces of the PN devices are preferably planar passivated with an integrally grown quarter wavelength anti-reflection coating that will allow a surface to be cleaned if it is inadvertantly touched or otherwise smudged during assembly or repair. In that regard it should be noted that the photo-sensitive P surfaces of the devices are electrically connected together and are grounded to the support 19. The N surfaces of the devices are isolated and brought out on independent leads through the rear of the holder (not shown in FIG. 4) and passed through the housing 15 of the sensor assembly unit into its associated electronic package 16.

The silicon PN devices optimally operate in the 0.8 to 1.05 micron spectral region and have a peak response at 0.9 mocrons when used in conjunction with a Schott RG 780 glass filter. Since that is ideal for infrared detection of radiation from a xenon beacon, the window 18 is made from that type of glass filter.

In operation, each PN device of a sensor assembly unit will respond to infrared radiation and produce an electrical output signal having an amplitude proportional to the radiation being received. The independent signal level of each device is connected to a separate processing channel as shown in FIG. 6. For example, the PN device 23 at the center of the array may be connected to a channel 30 to energize a lamp $L_{11}$ when the center of the array receives infrared radiation. The lamp $L_{11}$ is physically located behind a translucent segment 31 of a display instrument illustrated in FIG. 7. Similarly, radiation received by the PN device 26 will energize a lamp $L_{14}$ through a channel 32 to illuminate a translucent segment 33.

Since the array of PN devices in the assembly unit 12 is disposed to receive radiation from a field of view in elevation of 7° centered about 0°, the PN devices 20 to 26 are connected to seven lamps associated with translucent segments on the display instrument shown in FIG. 7 disposed on the left (port) side of a vertical line representing 0° in an arcuate array from 0° to − 100° in azimuth, each segment occupying 15° of the arc and centered between two other arcuate arrays. Thus, each translucent display segment represents a field of view which is 15° in azimuth and 7° in elevation. However, because of the overlap in the subfields of 5°, the azimuth lines on each side of a vertical "0" is marked 10°; other lines are then suitably marked 25°, 40°, 55°, 70°, 85° and 110° as the angular position increases from the 0 line.

PN devices 40 to 46 are positioned above the array of devices 20 to 26 in the installation of the sensor assembly unit 12 for a field of view in elevation from + 3.5° to + 10.5°. Accordingly, the array of devices 40 to 46 are connected to lamps that illuminate the arcuate array of translucent segments on the left of the 0 line and at the greatest radius from the center of the display in FIG. 7. The remaining segments of the display on the left of the 0 line are then illuminated by the remaining array of PN devices having a field of view in elevation from − 3.5° to − 10.5°.

As noted hereinbefore, the sensor assembly unit 11 is identical to the sensor assembly unit 12 and mounted in the nose 10 of the aircraft as a mirror image by effectively rotating the assembly unit 11 through 180° about the axis of the aircraft from the position of the assembly unit 12 to the position assigned to the assembly unit 11. All of the sensor devices then have the same field of view in azimuth as the sensor devices in the assembly unit 12 but with positive angles relative to the forward direction of 0°. At the same time, the roles of the outside rows of PN devices are reversed such that while the PN devices 40 to 46 of the sensor assembly unit 12 have a positive field of view from + 3.5° to + 10.5°, the corresponding PN devices in the sensor assembly unit 11 have a negative field of view from − 3.5° to − 10.5°.

By properly connecting the PN devices of the sensor assembly unit 11 to display lamps mounted in the instrument shown in FIG. 7, each through a separate signal processing channel, the proper association is maintained between the PN devices of the sensor assembly unit 11 and the translucent display segments on the right (starboard) side of the vertical 0 line. In that regard, it should be noted that while incandescent lamps are shown in FIG. 6 for illuminating display segments of the instrument in FIG. 7, it should be understood that the lamps may be gas discharge lamps, such as neon lamps, or electroluminescent cells. If electroluminescent cells are used, the cells themselves constitute the display segments. Otherwise, the translucent segments are formed by a translucent plate over a grid which optically separates the various lamps. It should also be noted that while arcuate arrays of display segments are illustrated in FIG. 7, it is obvious that the display segments may be disposed in a rectangular array with the rows representing fields of view in elevation, the center row being centered about 0°, and the columns representing fields of view in azimuth at successively greater angles for the successive columns on either side of the center of the array, as illustrated in FIG. 12 for a second embodiment to be described with reference to FIGS. 10 and 11.

Before describing the signal processing channels, all of which are identical and include means for reducing (or virtually eliminating) false alarms, it should be noted that the 5° overlap in the field of view illustrated in FIG. 1 provides a 10° sector directly in front of the aircraft from which both sensor assembly units 11 and 12 may receive radiation from a single source. For example, if an aircraft carrying a xenon beacon is directly in front of the aircraft carrying the sensor assembly units 11 and 12, adjacent display segments on both sides of the 0 line of the instrument shown in FIG. 7 will be illuminated. In that manner a corridor directly in front of the aircraft carrying the sensor assembly units 11 and 12 is converted from a "blind spot" into a sector of augmented detection. That is so because a threatening aircraft within the 5° overlap will cause two adjacent display segments to be illuminated, thereby presenting a larger visual display which will immediately indicate that the threatening aircraft is "dead ahead", i.e., within the 10° sector bisected by the axis of the aircraft. In contrast, an illuminated segment not adjacent to the center line on the instrument defines a larger sector of 15°. If only one display segment adjacent to the center line of the instrument is illuminated, and not both, the pilot will know that the threatening aircraft is not within the 10° sector centered about the axis of the aircraft, and can deduce that the threatening aircraft is at a relative bearing of from + 5° to + 10° to the right or from − 5° to − 10° to the left, depending on which side of the 0 line the illuminated segment appears. Thus, by providing a 5° overlap in the field of view of the two sensor display units mounted on opposite sides of the nose of an aircraft, the more critical area from − 10° to + 10° is effectively divided into three fields of view from pairs of PN devices having fields of view of 15° each in azimuth.

It should be noted that although two sensor assembly units are employed in this exemplary embodiment of the present invention, one unit on each side of the nose of an aircraft, it would be feasible to use a single assembly unit mounted on the nose of the aircraft by simply configuring the array of PN devices to provide a single continuous field of view of, for example, − 105° to + 105° in azimuth and + 10.5° to − 10.5° in elevation. It should also be noted more devices may be used, each device made smaller to divide the single field of view into smaller sectors. Alternatively, two sensor assembly units may be employed each with a continuous field of view in azimuth from − 105° to + 105° and with separate but overlapping fields of view in elevation. The best configuration to use on a given situation will, of course, be determined by the configuration of the particular aircraft on which the present invention is to be employed. Once the configuration for the sensor assembly unit, or units, has been selected, the configuration of separately illuminated segments of a display instrument may be arranged to indicate the angular position of a threatening aircraft in terms of relative elevation and azimuth.

In the exemplary embodiment illustrated, each sensor unit includes 21 identical signal processing channels. Each channel receives information from one element of the sensor array, as illustrated in FIG. 8 for a given PN device. However, in some system applications it may become more economical to provide a single channel with a suitable multiplexer, such as in applications where more information is desired about the threatening aircraft besides its angular position. The manner in which multiplexing should be provided would be obvious to one skilled in the art.

In the signal processing channel of FIG. 8, a silicon PN device is illustrated as a junction diode $D_1$ having its anode (P surface) connected to circuit ground. As noted hereinbefore, such a device operates in the spectral region of about 0.8 to 1.05 microns with a peak response at 0.9 microns when used in conjunction with a Schott RG 780 glass filter. The device itself has inherent response cut off for wavelengths greater than about 1.05 microns, and the window filter cuts off wavelengths less than about 0.8 microns.

Since radiation from the sun is within the spectral region of the PN device, a biasing circuit is provided to maintain an adequate reverse bias for eliminating current flow when background irradiance due to direct or reflected sunlight is high. The circuit comprises resistors 49 and 50 (and the internal resistance 51 of the PN device) connected in series with a source of + 3.7 volts DC to establish the normal background reverse bias.

The value of the resistor 50 is 1 kilohm and the junction between the resistors 49 and 50 is connected to AC ground by a capacitor 52 of 6.8 pf. A capacitor 53 of 6.8 pf is also connected to the junction between the resistor 49 and the source of the reverse bias voltage to further ground AC signals which may otherwise be transmitted into the power supply through the resistor 49 having a value of 200 ohms. Accordingly, the PN device operates into a load of approximately 1 kilohm with its inherent capacitance of 600 pf in parallel, as shown by a dotted line capacitor 54.

In order to optimize the signal to noise ratio with the various system parameters, including the characteristically fast rise of a xenon radiation pulse and relatively short pulse duration, the electrical bandwidth of each signal processing channel is set between 1.5 kHz and 35 kHz at the 3-db points. A capacitor 55 is connected in parallel with the PN device with a value of 0.0047 microfarads to set the upper 3-db point at 35 kHz. The signal thus limited in frequency is AC coupled into a broadband low level, high gain preamplifier 56 by a capacitor 57.

The preamplifier comprises two cascaded operational amplifiers 58 and 59 for a total gain factor of about 37,000. The first stage is an inverting amplifier having a differential input and negative feedback through a resistor 60. The second coupled by a capacitor 61 is a non-inverting amplifier having a differential input and negative feedback through a resistor 62. Each stage is conventional: The voltage appearing between the differential amplifier inputs (+) and (−) approaches zero as the output voltage increases in response to an input signal due to the negative feedback provided. The second stage includes filter networks to control frequency response, particularly to lower the cutoff frequency to the limited frequency range of the input signal, using conventional techniques for frequency compensation.

To set the lower 3-db point of the channel at 1.5 kHz, an RC filter network is employed at the output of the preamplifier 56. That filter network comprises a capacitor 63 of 0.047 microfarads and a resistor 64 of approximately 2 kilohms, and functions as a differentiator for maximizing the amplitude of the signal to the threshold detector for pulses having a fast rise, i.e., a large slope, by producing a signal amplitude proportional to the slope of the pulse.

A threshold level detector 65 converts the analog signal received into a binary signal at 0 volts, when the input signal is below a threshold level, and at a predetermined level (such as +3 volts) when the input signal exceeds the threshold level. When the input signal again drops below that level, the binary output signal drops to zero. Known circuits of various configurations may be employed to provide this threshold detection function, such as the amplifier circuit configuration shown commonly referred to as a differential comparator in which the input analog signal is compared with the desired threshold level set by a potentiometer 66 through an emitter follower $Q_1$ that also establishes the threshold level for all other channels. A control knob 67 for the potentiometer is provided on the face of the display instrument, as shown in FIG. 7, to permit the pilot to directly control the sensitivity of the system.

The differential comparator 65 is simply a conventional high gain difference amplifier that quickly saturates when the input signal exceeds the reference voltage level (TH) to provide a stepped output from a continuously varying input as indicated by the waveforms below it. To avoid having to provide high gain for this type of stepped operation of an otherwise linear difference amplifier, a single stage, low gain difference amplifier of the commonemitter type may be used if provided with regenerative feedback by connecting the collector of the input transistor to the base of the reference transistor. Such a circuit is commonly referred to as a Schmidt trigger circuit. In the simple form just suggested there is a hysteresis in that the output signal will not return to zero until the input signal has dropped some voltage below the reference, but this hysteresis may be made very small by proper choice of circuit parameters of by simply varying a resistor in series with the emitter of the reference transistor until the hysteresis is reduced to zero or to the point desired.

A maximum safe input voltage to the threshold level detector 65 is limited to, for example, 5.6 volts DC. Accordingly, it is desirable to limit the input to the threshold detector, as by a zener diode $D_2$ connected between the input of the threshold level detector and circuit ground.

The signal processing channel thus far described is a passive infrared detection system that may be used to some advantage to energize a lamp directly through a transistor $Q_2$ whenever the input signal exceeds the threshold level. However, to eliminate false alarms, a logic network is provided comprising a 0.6 second non-retriggerable timing circuit 68, a 1.5 second retriggerable timing circuit 69, and a counter consisting of two J-K flipflop $FF_1$ and $FF_2$. The term "retriggerable" is used to mean that the timing circuit 69 will respond to the leading edge of a positive pulse even when already in its active timing state, and will time 1.5 seconds from that time unless again retriggered. The non-retriggerable timing circuit 68 will not respond to another pulse once it has been triggered until after its 0.6 second timing period has expired.

The J-K flipflops are interconnected as shown to count three pulses from the timing circuit 68, and to effectively block out other pulses by hanging up at a count of three, until reset by the timing circuit 69 as will be presently described with reference to FIG. 9. To better understand the counting operation that results from connections shown, it would be helpful to review here the operating characteristics of a J-K flip-flop by the following table which shows the states of the flip-flop after clock pulse n+1 is applied to an input terminal CP for the four possible states, or levels, of input signals at input terminals J and K.

| J | K | $Q_{n+1}$ |
|---|---|---|
| 0 | 0 | $Q_n$ |
| 0 | 1 | 0 |
| 1 | 0 | 1 |
| 1 | 1 | $\bar{Q}_n$ |

It should be noted that the J input terminal of the least-significant-bit flip-flop $FF_1$ is not connected to receive an input signal. This allows the two-bit counter to count to three in the normal manner in response to three input pulses, and to remain at the count of three when additional input pulses are received until both flip-flops are reset. Leaving the J input terminal unconnected in this counter is equivalent to connecting a continuous bit-1 signal (+5 volts) due to the inherent characteristics of the J-K flip-flop defined by the foregoing table.

Before describing the operation of the logic network, the theory on which it is based will be described. Tests and data on existing aircraft xenon beacons indicate that they operate with a pulse repetition rate of 40 to 100 pulses per minute, or a time between pulses of about 1.5 to 0.6 seconds, depending upon the individual beacon, with a pulse length of about 1.5 milliseconds and a short rise time on the order of 20 to 50 microseconds. False alarms created by infrared radiation not emitted by the aircraft beacons can be eliminated by detecting only those infrared radiation pulses having these characteristics.

The short rise time is detected by the high pass filter comprising the capacitor 63 and resistor 64. That filter functions as a differentiator to discriminate against all pulses except those having a rise time of not more than about 50 microseconds and to provide a signal to the threshold detector 65 of 20 to 50 microseconds duration with an amplitude proportional to the rate of the positive rise of an input pulse. This by itself will significantly reduce false alarms. The threshold level may be adjusted by the sensitivity control knob 67 which sets the potentiometer 66 to establish a threshold level.

To further reduce false alarms, the logic network is adapted to accept only pulses with a repetition rate of 40 to 100 per minute, or a time between the trailing edge of successive pulses not less than 0.6 seconds apart or more than 1.5 seconds apart. A further requirement is that at least three pulses be received in succession with the minimum rise time and a repetition rate of 40 to 100 per second before turning a lamp L on.

The manner in which the logic network functions to further reduce false alarms, and virtually eliminate them, will now be described with reference to FIGS. 8 and 9. The latter shows in a first waveform A pulses received from the threshold level detector 65. For convenience, the waveforms are keyed to points in the schematic diagram of FIG. 8. As noted hereinbefore, when the input pulse to the detector goes below the threshold level set through the transistor $Q_1$, the output of the detector returns to zero thereby indicating the end of an infrared radiation pulse.

The leading edge of the output pulse from the threshold detector is differentiated by a capacitor 68 and a resistor 69. A diode network 70 shunts the negative pulses produced by the differentiating network at the end of the output pulse, thus producing waveform B which triggers a 0.6 second timing network comprising a first differential comparator (inverting operation) amplifier 71 adapted to function as a 0.3 sec. monostable multivibrator by a feedback capacitor 72, and a second differential comparator (inverting operational) amplifier 73 similarly adapted to function as a 0.3 sec. monostable multivibrator connected in cascade by a differentiating network 75. The result is a pair of pulses produced in sequence for each input pulse as shown in waveforms C and D.

The signals at points C and D are connected to the base of a shunt switch (transistor $Q_3$) by an inverting amplifier 76 via an OR gate 77 to lock out any other input pulse during the 0.6 sec. timing period, such as the second pulse of waveform A. Otherwise, the first monostable multivibrator would be triggered a second time, thereby retriggering the second monostable multivibrator 73 to extend the basic timing period beyond 0.6 seconds. Two multivibrators are used in cascade to allow ample time for the first to recover and be ready to be triggered again by another pulse more than 0.6 seconds after the first, such as pulse 3 in the sequence of waveform A. However, a single monostable multivibrator may be used of a type commercially available in integrated circuit form, the recovery times of which are 10 percent of the RC timing period. Should an input pulse occur during the recovery period, the monostable multivibrator will be triggered again, but the period of its output pulse will be less than the full 0.6 seconds desired, thereby slightly increasing the probability that a spurious pulse, such as pulse 2 of waveform A, will be counted.

The output pulses from the first monostable multivibrator at point C are inverted by an amplifier 78 as shown in waveform E to form "clock" pulses for the counter comprising the flip-flops $FF_1$ and $FF_2$. Each clock pulse advances the count by an increment of one, until a count of three is reached, as noted hereinbefore. Each clock pulse also retriggers a timing circuit comprising transistors $Q_4$ and $Q_5$, and an RC timing network (capacitor 80 and resistor 81), even when the circuit is already in its active timing state. It will then time a period of 1.5 seconds from the last clock pulse received, as shown in waveform E.

After a lapse of 1.5 seconds without another pulse from the threshold level detector 65, the trailing edge of the output signal from the transistor $Q_5$ resets the counter to zero. In that manner, the first three pulses occurring in succession are not accepted as an alarm because they have occurred at a repetition rate greater than 100 per minute. If the second pulse had not occurred and only the first and third pulses shown in waveform A had been transmitted by the threshold level detector 65, the repetition rate would have been proper, but the logic network would still not have accepted them as an alarm because there were not at least three properly spaced pulses occurring in succession.

When the second train of pulses (pulses 4 to 7) are received from the threshold detector 65, the first pulse triggers the first multivibrators comprising amplifier 71, and thereby increments the counter to 1. The pulse 5 again triggers the first multivibrator, increments the counter to two and resets the timing of the timing circuit comprising the capacitor 80 and resistor 81. The pulse 6 operates on the first multivibrators and timing circuit in the same manner as pulse 5 and increments the counter to three. When the count of three has been reached, a decoder comprising a diode AND gate (diodes $D_3$ and $D_4$) will turn the transistor $Q_2$ on via a buffer diode $D_5$ to energize lamp L. Thereafter, when pulse 7 of the second train is received from the threshold level detector 65, the first multivibrator is again triggered and the timing of the 1.5 second timing circuit is reset in the same manner as when the pulses 5 and 6 of the train were received. However, as noted hereinbefore, the output pulse from the first monostable multivibrator will not change the state of the counter owing to the manner in which the J-K flip-flops $FF_1$ and $FF_2$ are interconnected, as shown, with a 0 connected to the K input terminal of the flip-flop $FF_2$. Accordingly, the lamp L will remain energized until the 1.5 second timing period has run out without a further pulse being received from the threshold level detector 65, at which time the trailing edge of the output signal from the transistor $Q_5$ will reset the flip-flops $FF_1$ and $FF_2$. The lamp L is then turned off as shown in the timing diagram of FIG. 9. In that manner, even if more than three false alarm pulses are received from the threshold detector 61 by the logic network, the pilot of the aircraft carrying the warning system may be able to recognize the warning given by the lamp L as a false alarm if it appears for only a short period of a little more than 2 seconds and an adjacent segment is not then illuminated.

Failure to receive a pulse from the threshold level detector 65 that should have been received after pulse 7 of the second train would not be detremental should the second train result from a true alarm because a third train will then follow to increment the count to three in response to three successive pulses to again turn the lamp L on as shown in the timing diagram of FIG. 9. Once the lamp L has been turned on, it will remain on until the logic network fails to receive another pulse within the maximum period of 1.5 seconds.

Operation of the 1.5 second timing circuit will now be described. At the beginning of a timing period, a negative charge is stored on the capacitor 79 to back bias a diode $D_6$ and the base emitter junction of the transistor $Q_2$. When the capacitor has been discharged by negative current through a resistor 80 and charged sufficiently positive to forward bias the diode $D_6$ and emitter base junction of the transistor $Q_5$, the transistor $Q_5$ conducts to reset the counter. A clock pulse from the amplifier 78 differentiated by a network 87 will thereafter turn the transistor $Q_4$ on via diodes $D_7$ and $D_8$, and a zener diode $D_9$. When the transistor $Q_4$ is turned on, the transistor $Q_5$ is turned off and the capacitor 80 is again charged negatively through a resistor 82 and the transistor $Q_4$. The resistor 82 is selected to be very small in order to restore the original negative charge of the capacitor 79 during the short positive peak of the differentiated pulse. Thereafter, the transistor $Q_4$ is turned off to start the 1.5 second timing period. If another clock pulse occurs during the 1.5 second timing period, the transistor $Q_4$ is turned on again to restore the sssssssssss original negative charge on the capacitor and initiate a new 1.5 second timing period from the trailing edge of the clock pulse.

The parameters of the differentiating network are selected to provide a sufficiently long positive peak at the leading edge of the clock pulse to assure the charge on the capacitor 79 is fully restored. The time that requires is controlled by the value of the resistor 82.

It should be noted that although a special timing circuit has been provided for the 1.5 second period, any monostable multivibrator may be employed by adding to it a charge restoring switch like the transistor $Q_4$. The trailing edge of the clock pulse would then trigger the monostable multivibrator through a differentiating network. Thus, any monostable multivibrator may be made retriggerable, and commercially integrated circuit monostable multivibrators that are adapted to be retriggerable are commercially available.

The system described with reference to FIGS. 1 to 7 may be used in a fixed platform as well as an aircraft. The signal processing channels would remain the same in configuration and operation as that described with reference to FIGS. 8 and 9.

Figure 11:
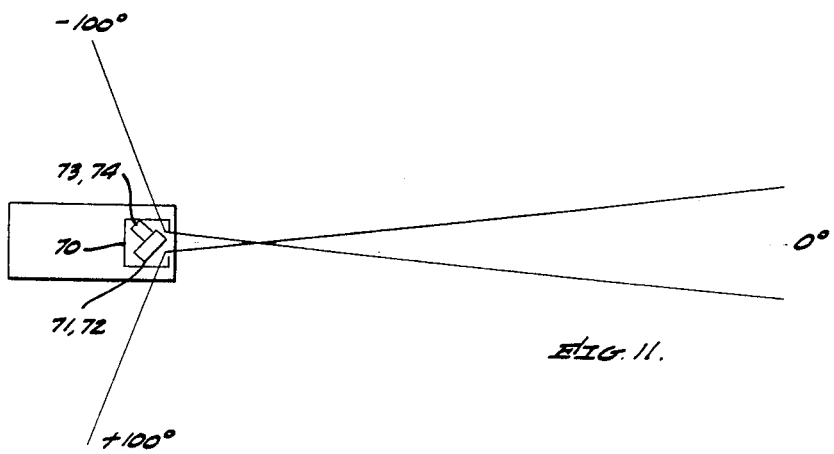
FIG. 11 is a diagramatic plan view of the second embodiment of FIG. 10.
Figure 12:
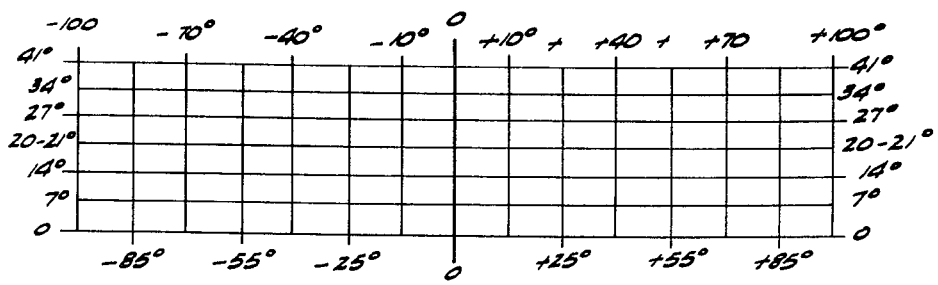
FIG. 12 illustrates a format for a data display unit for use with the second embodiment of FIGS. 10 and 11.

FIGS. 10 and 11 illustrate side and top view diagrams of a fixed platform installation having a total field of view in elevation from 0° to +41° and in azimuth from −100° to +100° relative to a zero axis. The platform may consist of a control tower 70 at an airport, and the installation may consist of four sensor assembly units 71, 72, 73 and 74, each of substantially the same configuration as that described with reference to FIGS. 3 to 6.

The units 71 and 72 are arranged to provide a field of view from 0° to +21° with a 5° overlap as in the moving platform (aircraft) installation of FIG. 1, but that is not essential. Instead, each unit may be expanded to provide one continuous field of view from +110° to −110°. The units 73 and 74 similarly arranged, but tilted for a field of view from +20° to +41°, may also be combined into one unit.

The field of view of the second pair overlaps the field for the first pair by 1° to avoid any gap in elevation of the total field being monitored, but such a gap may also be avoided by making the second pair a continuation of the first. However, if the two pair are combined in azimuth, other types of optical lens may be preferred because with the configuration shown in FIG. 4 using a mirror lens, the combined pair would result in a support for the radiation-sensitive devices of twice the width and therefore substantially greater blurring of images focused on the devices. Thus, smaller and overlapping units of the type illustrated in FIG. 4 are preferred to make up a total field of view.

FIG. 12 illustrates a display system for the fixed platform arrangement of FIGS. 10 and 11. It consists of segments associated with and adapted to be illuminated by the radiation-sensitive devices of the units 71 to 74. The number of segments are twice the number in the display of FIG. 7 because of the larger total field being monitored. Because of the large number of segments it is preferred to arrange them in a rectangular matrix so that all segments will be of equal size.

It should be noted that while the airborne and ground systems described both have an overlap of 5°, and a field of view in azimuth for each device of 15°, other arrangements may be provided, such as a 2.5° overlap, or less. In that case, the azimuth lines in the display may be so numbered as to ignore the shift of the two subfields of view toward the center by such a small angle. Thus, the boundaries of display segments on each side of the 0 line could then be numbers 15°, 30°, 45°, 60°, 75°, 90° and 105°. Still another arrangement would be to use devices having a 17 ½° field of view on each side of the 0 line, and devices having a 15° field of view at all other positions of the sensor array. Then an overlap of 2.5° may be used and the azimuth lines would be accurately labeled 15°, 30° . . . 105°.

Still other arrangements may occur to those skilled in the art from the foregoing description of preferred embodiments. For example, a low-cost system for small, low-speed aircraft may employ eight radiation-sensitive devices, each with a field of view of at least 90° arranged in two circular arrays, one tilted up for a positive field of view, and the other tilted down for a negative field of view in elevation. That would provide for aircraft warning completely around the equipped aircraft, but with less resolution in both azimuth and elevation. However, a pilot in a small aircraft would normally require only an indication of which quadrant to look at for a threatening aircraft, and an indication of whether he should look up or down. The low speed of his aircraft will give him ample opportunity to visually locate the threatening aircraft and take some appropriate action, particularly if the threatening aircraft is also a slow speed aircraft. The display for such a low-cost system may consist of two concentric rings each divided into four equal segments, each segment being illuminated by a separate signal processing channel.

Since it is recognized that modifications and variations falling within the spirit of the invention will occur to those skilled in the art, it is not intended that the scope of this invention be determined by the disclosed exemplary embodiments, but rather that the scope be determined by the breadth of the appended claims.

What is claimed is:

1. A system for detecting radiation from strobed light beacons carried by aircraft, said radiation having a known peak power spectral region, comprising:

means for simultaneously monitoring unique segments of a given field of view for radiation pulses within said spectral region, said monitoring means comprises a plurality of radiation-sensitive devices for converting said radiation pulses into voltage pulses, said devices having an inherent response cutoff for wavelengths longer than the wavelength at the lower limit of said spectral region, and further comprises an optical filter for cutting off radiation to said devices of wavelengths shorter than the wavelength at the upper limit of said spectral region; and display means having a plurality of segments, each associated with a unique one of said field segments, and each display segment being adapted to be separately illuminated in response to said monitoring means detecting radiation pulses from a source in an associated one of said field segments when said radiation pulses within said spectral region are of a predetermined amplitude.

2. A system as defined in claim 1 wherein said display means includes a voltage threshold detector for determining when said voltage pulses exceed a level proportional to said predetermined amplitude, and further includes means for varying system sensitivity by varying said determining level of said threshold detector.

3. A system as defined in claim 1 wherein said monitoring means includes voltage signal amplifying means coupling said radiation-sensitive devices to said display means, said amplifying means having means for producing a signal amplitude proportional to the slope of the pulse.

4. A system as defined in claim 1 wherein said display means includes means for reducing the number of false alarms by inhibiting illumination of a given display segment in response to radiation pulses until three radiation pulses have been received with a period between successive pulses not greater than a first predetermined period and not less than a second predetermined period, where said first predetermined period is determined from the minimum pulse repetition rate of said strobed light beacons, and said second predetermined period is determined from the maximum pulse repetition rate of said strobed light beacons.

5. A system as defined in claim 4 wherein said display means includes means for terminating illumination of a given segment when a period greater than said first predetermined period expires without a radiation pulse being received from an associated one of said unique field segments.

6. A system as defined in claim 1 wherein said display means includes means for identifying detected radiation pulses originating from a strobed light beacon, said identifying means including means for discriminating between detected radiation pulses on the basis of the rise time of the pulses.

7. A system as defined in claim 1 wherein said display means includes means for identifying detected radiation pulses originating from a strobed light beacon, said identifying means including means for discriminating between detected radiation pulses on the basis of the repetition rate of the pulses.

8. A system as defined in claim 1 wherein said monitoring means includes means for identifying detected radiation pulses originating from a strobed light beacon, said identifying means including means for discriminating between detected radiation pulses as a function of the repetition rate, rise time and amplitude of the pulses.

* * * * *